United States Patent
Hwang

(10) Patent No.: US 7,334,604 B1
(45) Date of Patent: Feb. 26, 2008

(54) FAUCET HAVING MULTIPLE DIFFERENT WATER OUTLET MANNERS

(75) Inventor: Ren-Yih Hwang, Changhua Hsien (TW)

(73) Assignee: Chang Peng Metal Industrial Co., Ltd., Changhua Hsien (TW)

(*) Notice: Subject to any disclaimer, the term of this patent is extended or adjusted under 35 U.S.C. 154(b) by 232 days.

(21) Appl. No.: 11/231,038

(22) Filed: Sep. 20, 2005

(51) Int. Cl.
*F16K 11/00* (2006.01)

(52) U.S. Cl. ................ 137/597; 137/615; 137/625.41

(58) Field of Classification Search ............ 137/98, 137/100, 597, 615, 625.4, 625.41
See application file for complete search history.

(56) References Cited

U.S. PATENT DOCUMENTS

| | | | | |
|---|---|---|---|---|
| 3,373,770 A | * | 3/1968 | Ward et al. | 137/615 |
| 3,410,487 A | * | 11/1968 | Hyde | 239/26 |
| 3,653,407 A | * | 4/1972 | Katva | 137/615 |
| 3,726,318 A | * | 4/1973 | Hyde | 137/625.41 |
| 5,067,513 A | * | 11/1991 | Nicklas et al. | 137/98 |
| 6,321,788 B1 | * | 11/2001 | Egli | 137/615 |
| 6,328,067 B1 | * | 12/2001 | Hsiung | 137/615 |
| 6,394,133 B1 | * | 5/2002 | Knapp | 137/615 |

* cited by examiner

*Primary Examiner*—Stephen M. Hepperle
(74) *Attorney, Agent, or Firm*—Alan Kamrath; Kamrath & Associates PA

(57) ABSTRACT

A faucet includes a rotation unit, a primary water dividing unit, a water outlet member, a secondary water dividing unit, a first control switch, and a second control switch. Thus, the primary water dividing unit has two different water outlet manners, and the secondary water dividing unit also has two different water outlet manners, so that the faucet has multiple different water outlet manners by the primary water dividing unit and the secondary water dividing unit, thereby enhancing the versatility of the faucet.

19 Claims, 10 Drawing Sheets

FAUCET HAVING MULTIPLE DIFFERENT WATER OUTLET MANNERS

BACKGROUND OF THE INVENTION

1. Field of the Invention

The present invention relates to a faucet, and more particularly to a faucet having multiple different water outlet manners.

2. Description of the Related Art

A conventional faucet used for a bathroom is usually connected to two water outlet equipments, such as a shower head and a water outlet pipe. The faucet can mix cold and hot water to form mixed water which is selectively ejected outward from the shower head or the water outlet pipe. However, the conventional faucet only has two water outlet manners, so that it cannot satisfy the requirements of different users. In addition, the conventional faucet has a fixed structure and cannot be rotated freely, thereby easily causing inconvenience to the user in operation of the faucet.

SUMMARY OF THE INVENTION

In accordance with the present invention, there is provided a faucet, comprising a rotation unit, a primary water dividing unit mounted on the rotation unit, a water outlet member mounted on the rotation unit, a secondary water dividing unit mounted on the rotation unit, a first control switch mounted on the primary water dividing unit to open/close a water flow and to control a mixture proportion of cold and hot water, and a second control switch mounted on the primary water dividing unit to control water to flow into either one of the water outlet member and the secondary water dividing unit.

The primary objective of the present invention is to provide a faucet having multiple different water outlet manners to satisfy the requirements of different users.

Another objective of the present invention is to provide a faucet, wherein the primary water dividing unit has two different water outlet manners, and the secondary water dividing unit also has two different water outlet manners, so that the faucet has multiple different water outlet manners by the primary water dividing unit and the secondary water dividing unit, thereby enhancing the versatility of the faucet.

A further objective of the present invention is to provide a faucet, wherein the rotation unit is rotatable so that the faucet is rotatable so as to adjust the angle of the faucet.

Further benefits and advantages of the present invention will become apparent after a careful reading of the detailed description with appropriate reference to the accompanying drawings.

DETAILED DESCRIPTION OF THE INVENTION

Figure 1:
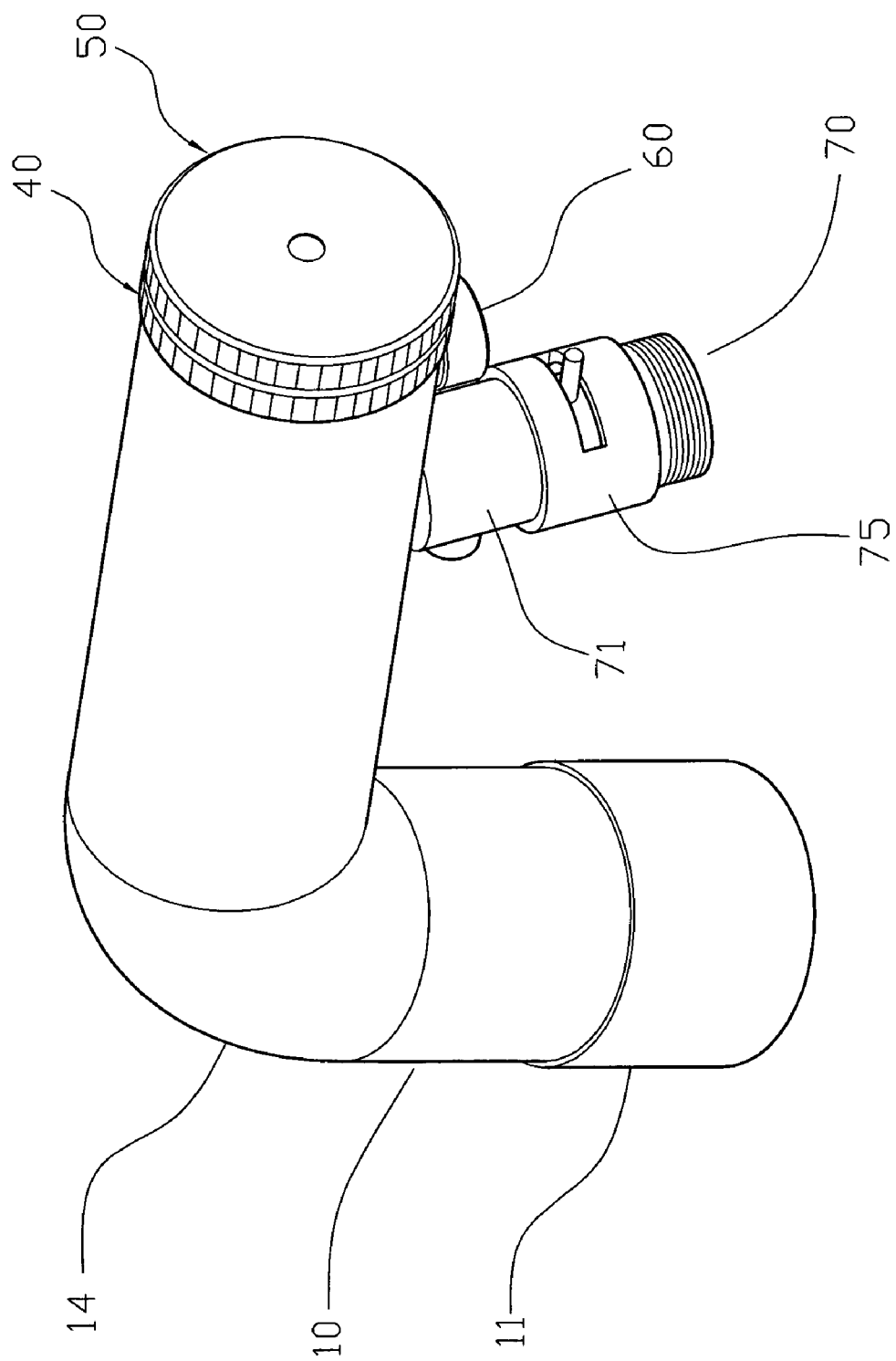
FIG. 1 is a perspective view of a faucet in accordance with the preferred embodiment of the present invention.
Figure 2:
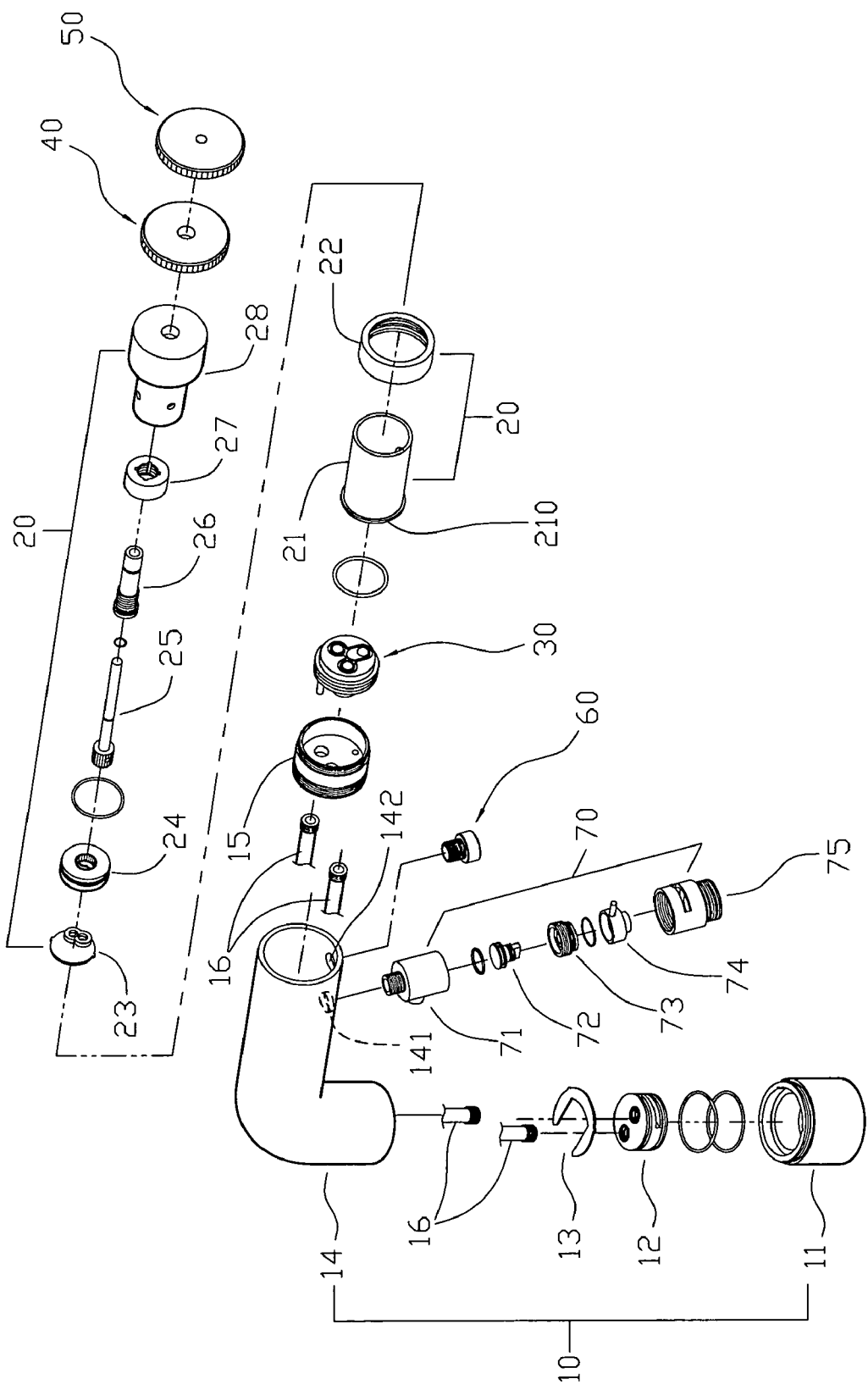
FIG. 2 is an exploded perspective view of the faucet as shown in FIG.

Referring to the drawings and initially to FIGS. 1 and 2, a faucet in accordance with the preferred embodiment of the present invention comprises a rotation unit 10, a primary water dividing unit 20 mounted on the rotation unit 10, a balance valve 30 mounted between the primary water dividing unit 20 and the rotation unit 10, a water outlet member 60 mounted on the rotation unit 10, a secondary water dividing unit 70 mounted on the rotation unit 10, a first control switch 50 mounted on the primary water dividing unit 20 to open/close a water flow and to control a mixture proportion of cold and hot water, and a second control switch 40 mounted on the primary water dividing unit 20 to control water to flow into either one of the water outlet member 60 and the secondary water dividing unit 70.

Figure 3:
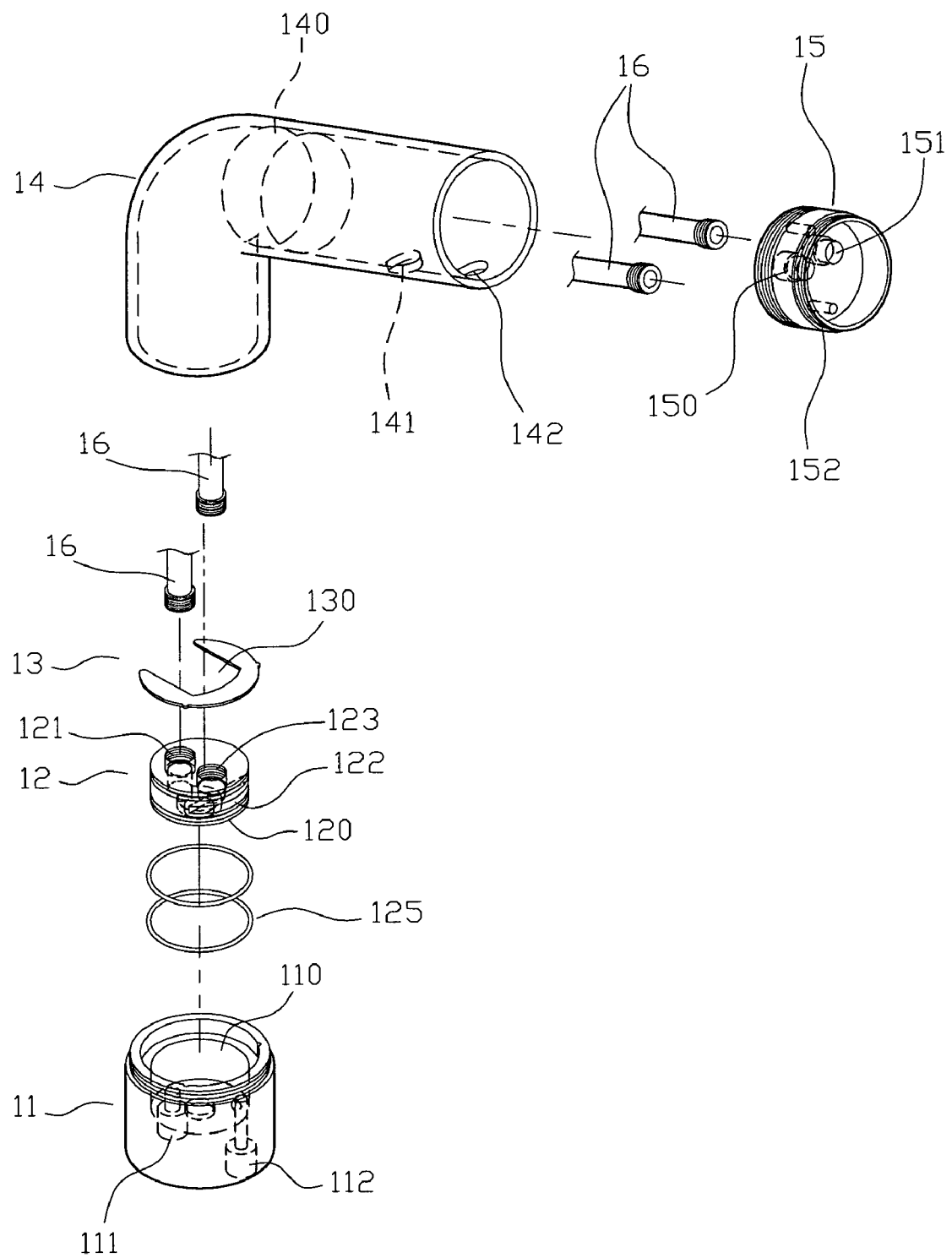
FIG. 3 is a partially exploded perspective view of the faucet as shown in FIG. 1.

Referring to FIGS. 1-3, the rotation unit 10 includes a fixing seat 11, a rotation seat 12, a limit plate 13, a connecting seat 14, a support seat 15, and two connecting pipes 16.

The fixing seat 11 is secured to a fixing member and has a first face formed with a receiving chamber 110 and a second face formed with a first water inlet channel 111 connected to a bottom of the receiving chamber 110 and a second water inlet channel 112 connected to a side of the receiving chamber 110. The first water inlet channel 111 and the second water inlet channel 112 of the fixing seat 11 allows passage of cold and hot water.

The rotation seat 12 is rotatably mounted in the receiving chamber 110 of the fixing seat 11 and has a first face formed with a first water inlet slot 120 that is constantly connected to the first water inlet channel 111 of the fixing seat 11 during rotation of the rotation seat 12, a side formed with a substantially arcuate-shaped second water inlet slot 122 that is constantly connected to the second water inlet channel 112 of the fixing seat 11 during rotation of the rotation seat 12, and a second face formed with a first water conducting hole 121 connected to the first water inlet slot 120 and a second water conducting hole 123 connected to the second water inlet slot 122. The rotation seat 12 has a periphery provided with a plurality of O-rings 125.

The limit plate 13 is secured in the receiving chamber 110 of the fixing seat 11 without rotation and rested on the rotation seat 12. The limit plate 13 is substantially U-shaped and has an inside formed with a limit hole 130.

The connecting seat 14 is rotatably mounted on the fixing seat 11 and connected to the rotation seat 12 so that the rotation seat 12 is rotated with the connecting seat 14. The connecting seat 14 is substantially V-shaped and has an inside formed with a mounting section 140 for mounting the support seat 15. The connecting seat 14 has a first portion mounted on the fixing seat 11 and a second portion formed with a first through hole 141 and a second through hole 142.

The support seat 15 is mounted in the connecting seat 14 and has an inside formed with two water inlet holes 150 and 151. The support seat 15 has an outer wall formed with an outer thread 152.

The two connecting pipes 16 are mounted in the connecting seat 14 to connect the first water conducting hole 121 and the second water conducting hole 123 of the rotation seat 12 to the two water inlet holes 150 and 151 of the support seat 15. The two connecting pipes 16 are limited by the limit hole 130 of the limit plate 13.

Figure 4:
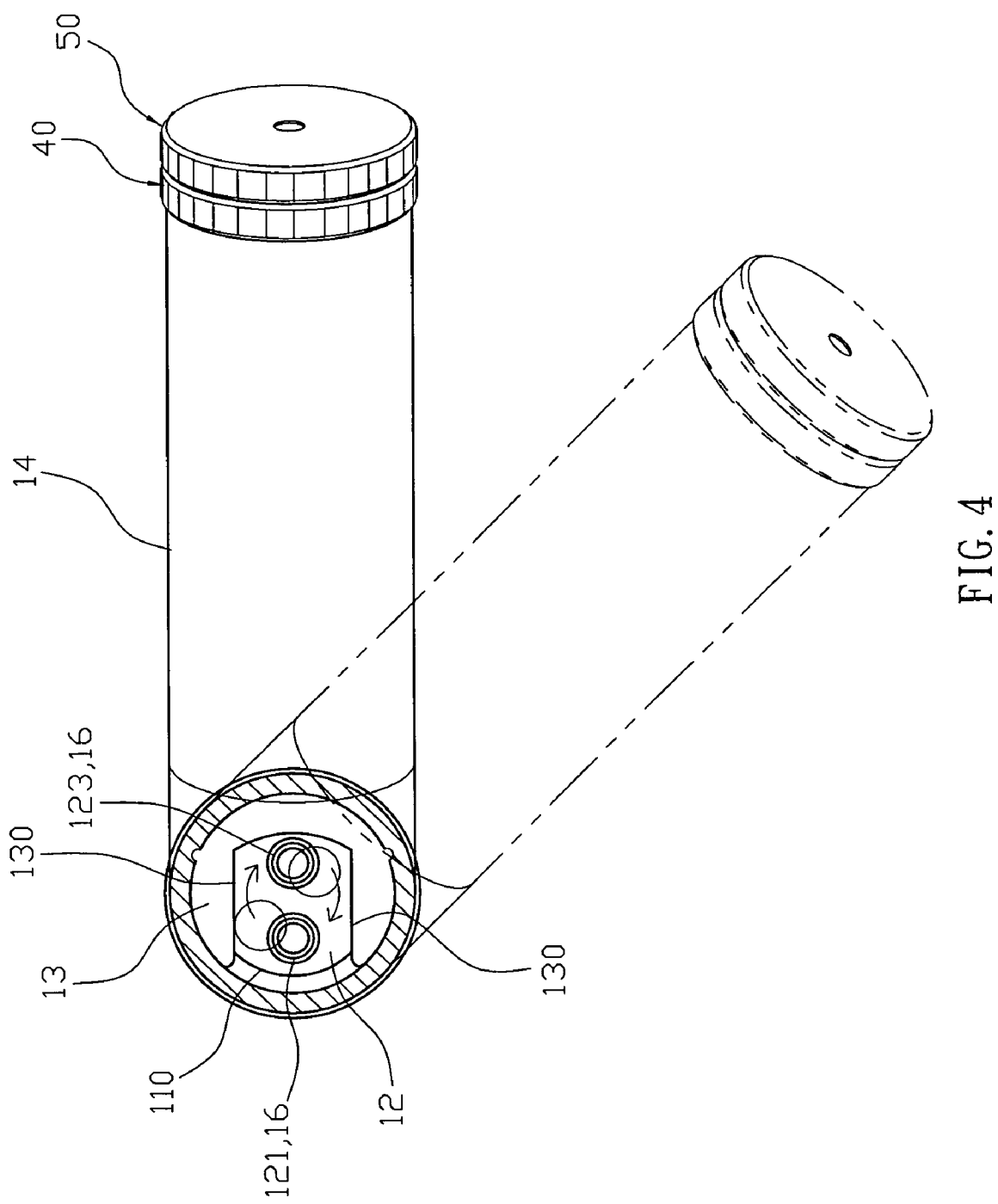
FIG. 4 is a schematic plan operational view of the faucet as shown in FIG. 1.
Figure 5:
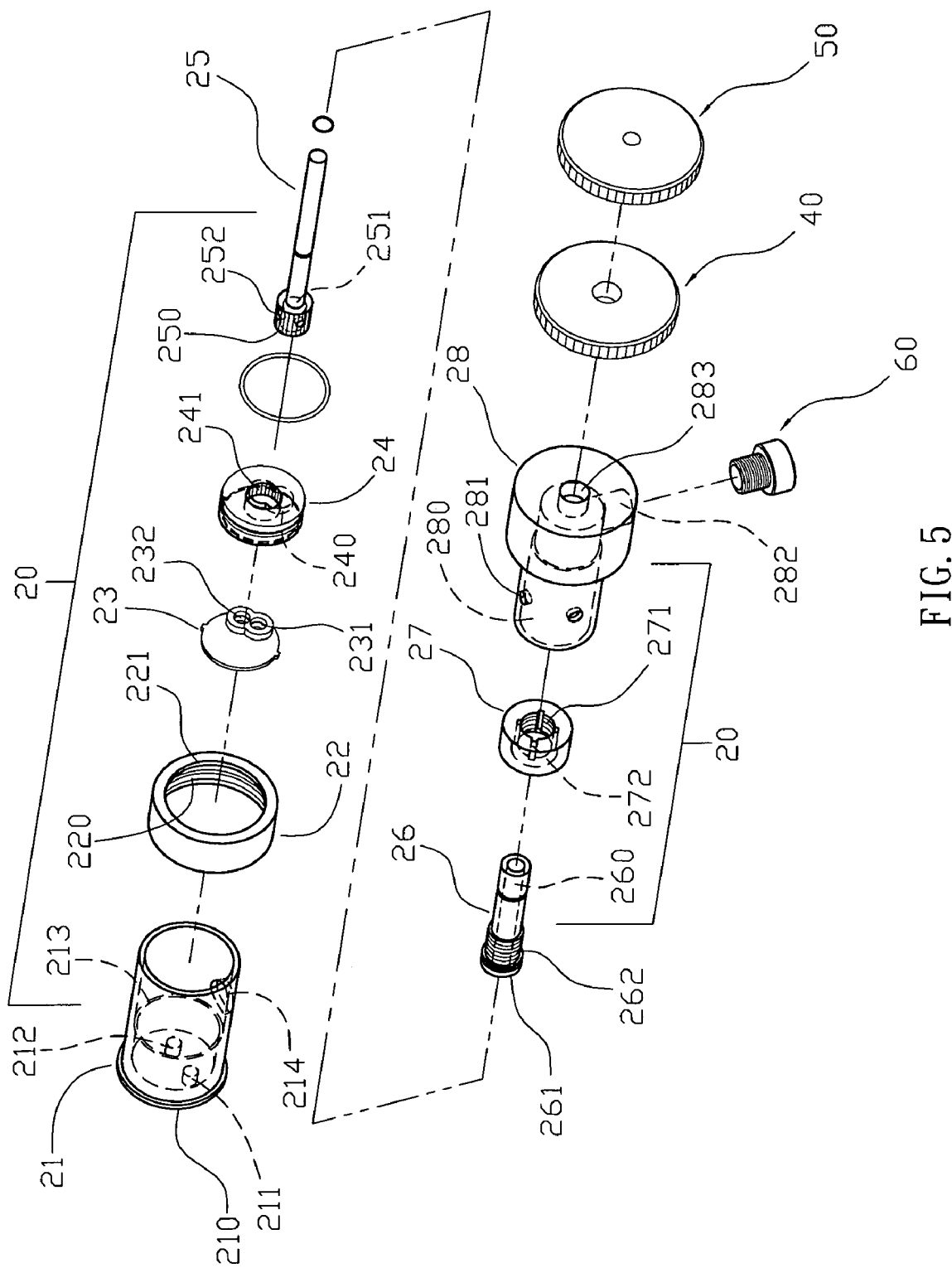
FIG. 5 is a partially exploded perspective view of the faucet as shown in FIG. 1.

When the connecting seat 14 is rotated as shown in FIG. 4, the rotation seat 12 is rotated with the connecting seat 14. At this time, the first water inlet slot 120 is constantly connected to the first water inlet channel 111 of the fixing seat 11 during rotation of the rotation seat 12, and the second water inlet slot 122 is constantly connected to the second water inlet channel 112 of the fixing seat 11 during rotation of the rotation seat 12, so that the water from the first water inlet channel 111 and the second water inlet channel 112 of the fixing seat 11 passes through the first water inlet slot 120 and the second water inlet slot 122 into the first water conducting hole 121 and the second water conducting hole 123 of the rotation seat 12 smoothly during rotation of the rotation seat 12. In addition, when the rotation seat 12 is rotated to a predetermined angle, the two connecting pipes 16 are limited by the limit hole 130 of the limit plate 13 to prevent excessive rotation of the rotation seat 12.

Referring to FIGS. 1-7, the primary water dividing unit 20 is mounted in the connecting seat 14 of the rotation unit 10 and includes an outer valve tube 21, a mounting ring 22, a water control plate 23, a water control seat 24, an inner valve tube 28, a control valve seat 27, a first control shaft 25, and a second control shaft 26.

The outer valve tube 21 has a closed bottom wall formed with two water control holes 211 and 212 connected to the two water inlet holes 150 and 151 of the support seat 15. The two water control holes 211 and 212 of the outer valve tube 21 are arranged in a circular rotation path and located at a first interval. The outer valve tube 21 has an outer wall formed with an outwardly extended flange 210 and an inner wall formed with a locking portion 213. The outer valve tube 21 has a periphery formed with a side water outlet hole 214 connected to the first through hole 141 of the connecting seat 14.

The mounting ring 22 is mounted on the outer valve tube 21 and secured to the support seat 15 of the rotation unit 10 to attach the primary water dividing unit 20 to the rotation unit 10. The mounting ring 22 has an inner wall having a first end formed with an inwardly extended flange 221 rested on the flange 210 of the outer valve tube 21 and a second end formed with an inner thread 220 screwed onto the outer thread 152 of the support seat 15.

The water control plate 23 is rotatably mounted in the outer valve tube 21. The water control plate 23 is rested on the bottom wall of the outer valve tube 21 and has an inside formed with two water control holes 231 and 232 connected to the two water control holes 211 and 212 of the outer valve tube 21. The two water control holes 231 and 232 of the water control plate 23 are arranged in a circular rotation path and located at a second interval different from the first interval of the two water control holes 211 and 212 of the outer valve tube 21.

Figure 7:
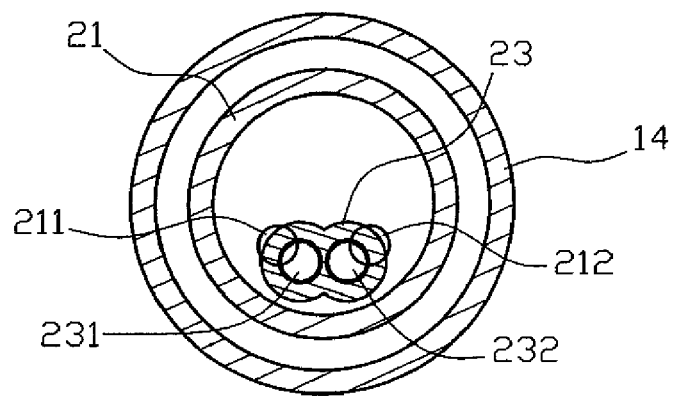
FIG. 7 is a partially side plan cross-sectional view of the faucet as shown in FIG. 1.

Thus, as shown in FIG. 7, the two water control holes 231 and 232 of the water control plate 23 are movable relative to the two water control holes 211 and 212 of the outer valve tube 21 by rotation of the water control plate 23 to regulate the water flow between the two water control holes 231 and 232 of the water control plate 23 and the two water control holes 211 and 212 of the outer valve tube 21, so that the cold water and the hot water are mixed with each other or ejected independently.

The water control seat 24 is rotatably mounted in the outer valve tube 21 and secured on the water control plate 23 to rotate the water control plate 23. The water control seat 24 has a first side formed with a regulating slot 240 connected to the two water control holes 231 and 232 of the water control plate 23 and a second side formed with an insertion hole 241 connected to the regulating slot 240.

The inner valve tube 28 has a first end extended into the outer valve tube 21 and having a periphery formed with a plurality of side water outlet holes 281 each connected to the side water outlet hole 214 of the outer valve tube 21, and a second end protruding from the outer valve tube 21 and having a periphery formed with a side water outlet bore 282 connected to the second through hole 142 of the connecting seat 14. The inner valve tube 28 has an inside formed with a receiving space 280 connected to the side water outlet holes 281 and the side water outlet bore 282. The second end of the inner valve tube 28 has an inside formed with a passage 283 to allow passage of the second control shaft 26.

The control valve seat 27 is secured in the receiving space 280 of the inner valve tube 28 and has an inside formed with a plurality of flow channels 272 each connected to the side water outlet bore 282 of the inner valve tube 28. The inside of the control valve seat 27 is formed with an inner thread 271.

The first control shaft 25 has a first end secured to the water control seat 24 to rotate the water control seat 24 and a second end protruding from the connecting seat 14 of the rotation unit 10. The first end of the first control shaft 25 has an inside formed with a water inlet recess 251 connected to the regulating slot 240 of the water control seat 24 and a periphery formed with a plurality of water outlet holes 252 each connected to the water inlet recess 251 and each connected to the side water outlet holes 281 of the inner valve tube 28 through the receiving space 280 of the inner valve tube 28. The first end of the first control shaft 25 is provided with an insertion portion 250 inserted into the insertion hole 241 of the water control seat 24.

The second control shaft 26 has a first end movably mounted in the control valve seat 27 and a second end protruding from the connecting seat 14 of the rotation unit 10. The first end of the second control shaft 26 has an end portion formed with an enlarged water stop 261 that is movable relative to the control valve seat 27 to open or seal the flow channels 272 of the control valve seat 27. The first end of the second control shaft 26 has an outer thread 262 screwed into the inner thread 271 of the control valve seat 27 so that the second control shaft 26 is movable relative to the control valve seat 27 by rotation of the second control shaft 26. The second control shaft 26 has an inside formed with a mounting hole 260 mounted on the first control shaft 25.

The first control switch 50 is secured on the second end of the first control shaft 25 to rotate the first control shaft 25.

The second control switch 40 is secured on the second end of the second control shaft 26 to rotate the second control shaft 26.

The water outlet member 60 is extended through the second through hole 142 of the connecting seat 14 into the side water outlet bore 282 of the inner valve tube 28. Preferably, the water outlet member 60 is an aerator, a spoiler or the like.

The secondary water dividing unit 70 is extended through the first through hole 141 of the connecting seat 14 and the side water outlet hole 214 of the outer valve tube 21 and connected to the side water outlet holes 281 of the inner valve tube 28.

In operation, when the first control shaft 25 is rotated by the first control switch 50, the water control seat 24 is rotated to rotate the water control plate 23, so that the two water control holes 231 and 232 of the water control plate 23 are movable relative to the two water control holes 211 and 212 of the outer valve tube 21 to regulate the water flow between the two water control holes 231 and 232 of the water control plate 23 and the two water control holes 211 and 212 of the outer valve tube 21, so that the cold water and the hot water are mixed with each other or ejected independently. Then, the water from the two water control holes 231 and 232 of the water control plate 23 in turn flows through the regulating slot 240 of the water control seat 24, the water inlet recess 251 of the first control shaft 25 and the water outlet holes 252 of the first control shaft 25 into the receiving space 280 of the inner valve tube 28.

Alternatively, when the second control shaft 26 is rotated by the second control switch 40, the water stop 261 of the second control shaft 26 is movable relative to the control valve seat 27 to open or seal the flow channels 272 of the control valve seat 27.

Figure 6:
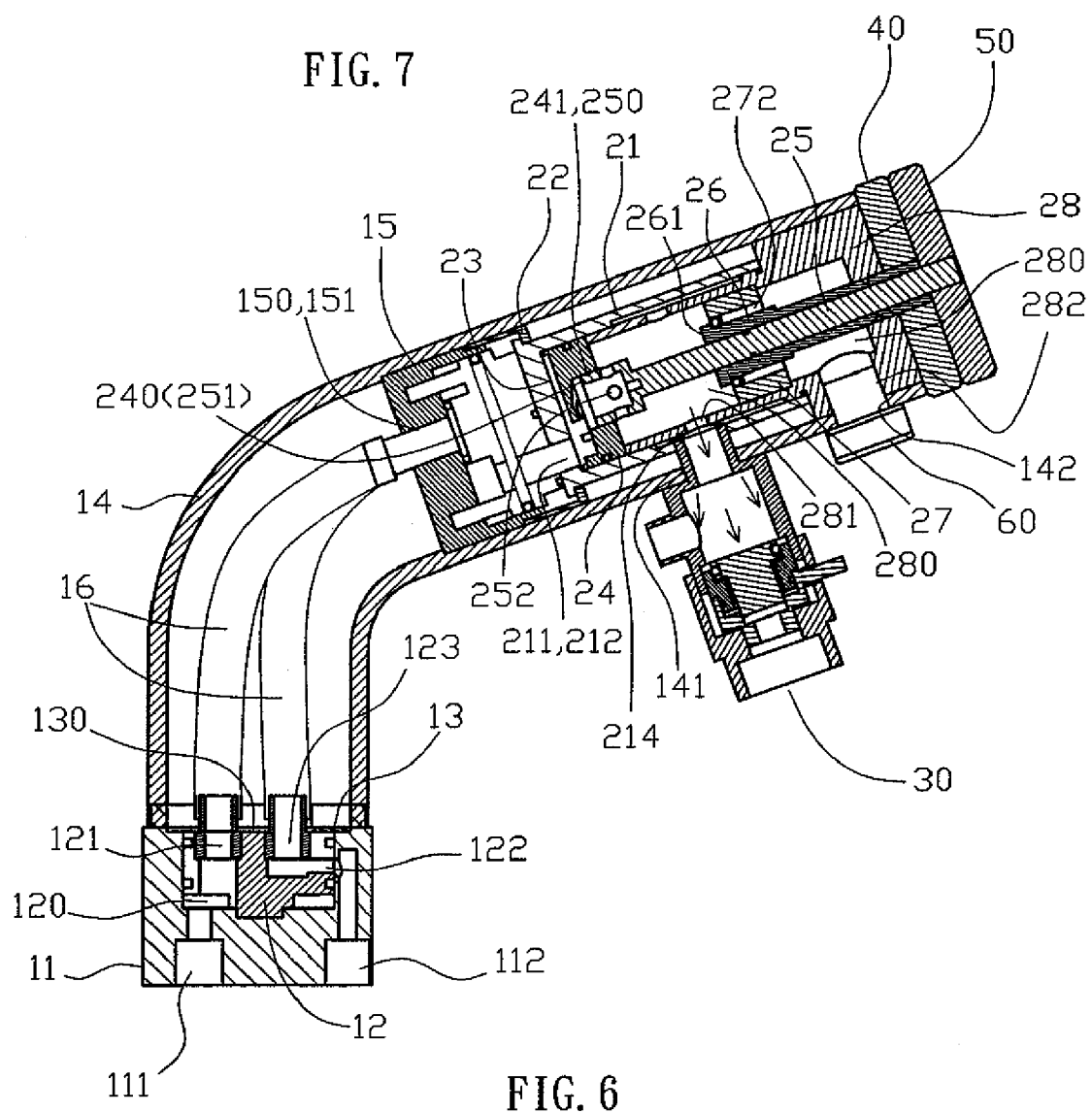
FIG. 6 is a plan cross-sectional view of the faucet as shown in FIG. 1.

As shown in FIG. 6, when the water stop 261 of the second control shaft 26 is movable relative to the control valve seat 27 to seal the flow channels 272 of the control valve seat 27, the water from the receiving space 280 of the inner valve tube 28 flows through the side water outlet holes 281 of the inner valve tube 28 into the secondary water dividing unit 70.

Figure 8:
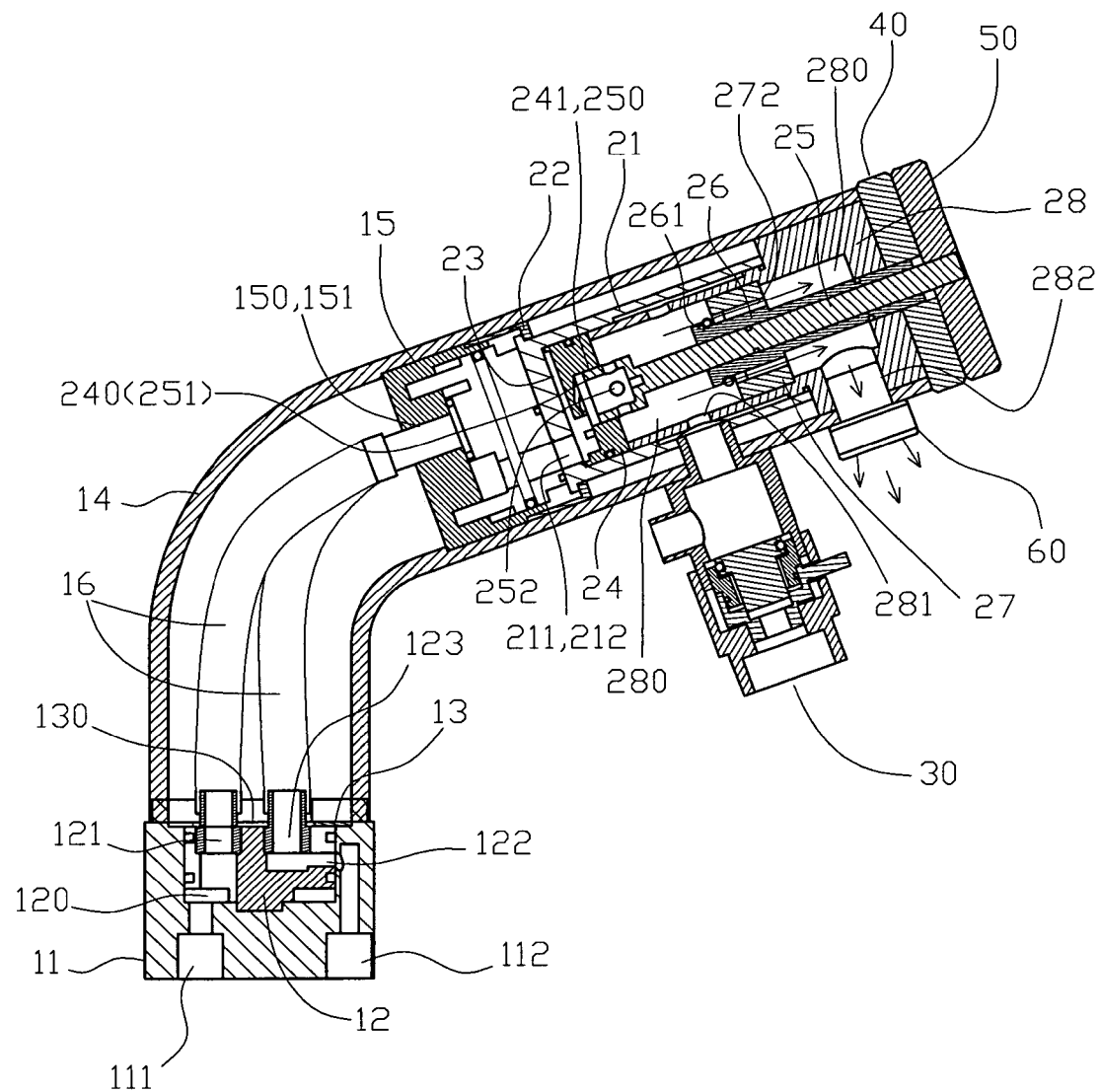
FIG. 8 is a schematic operational view of the faucet as shown in FIG. 6.

As shown in FIG. 8, when the water stop 261 of the second control shaft 26 is movable relative to the control valve seat 27 to open the flow channels 272 of the control valve seat 27, the water from the receiving space 280 of the inner valve tube 28 flows through the flow channels 272 of the control valve seat 27 and the side water outlet bore 282 of the inner valve tube 28 into the water outlet member 60.

Figure 9:
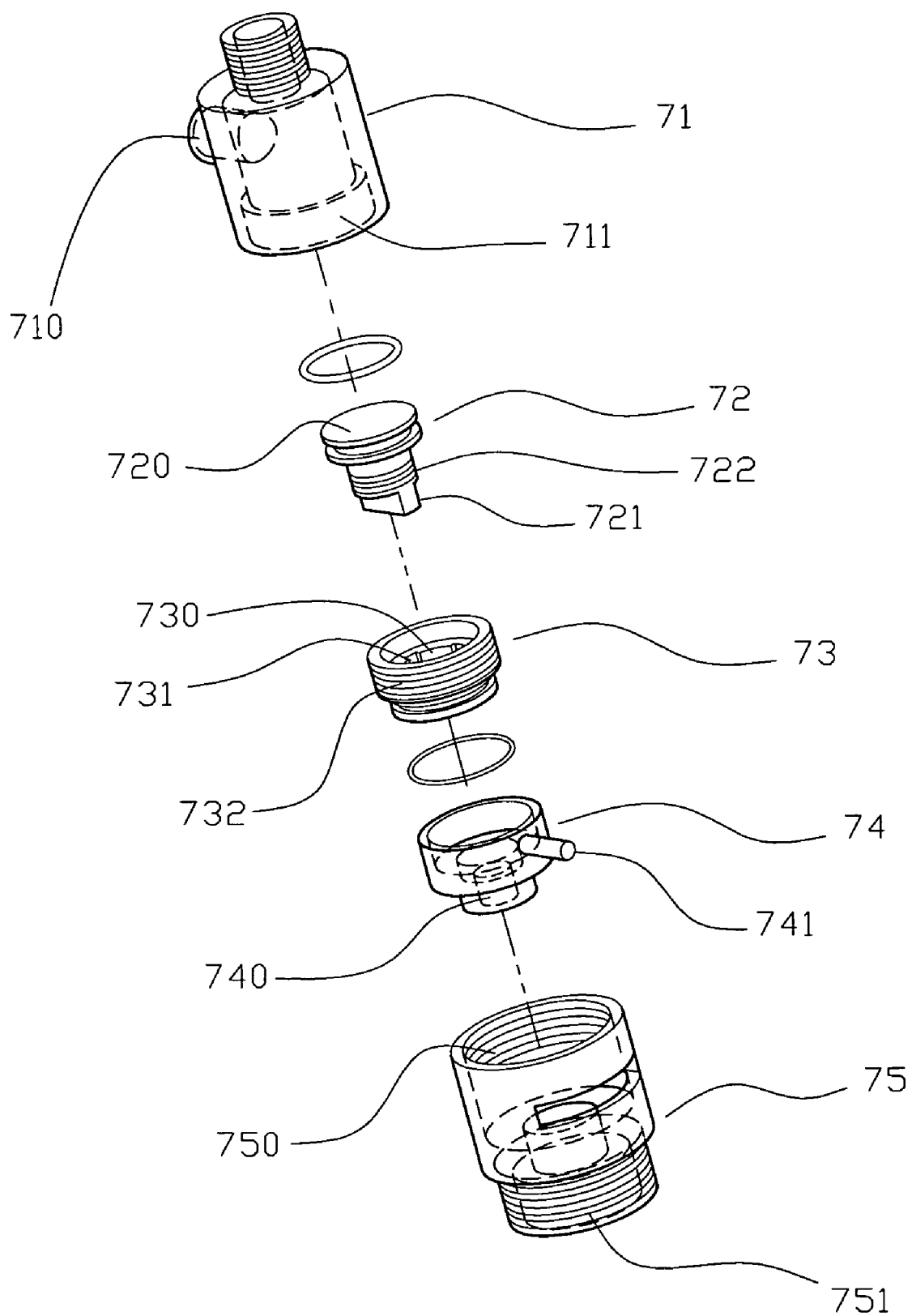
FIG. 9 is a partially exploded perspective view of the faucet as shown in FIG. 1.
Figure 10:
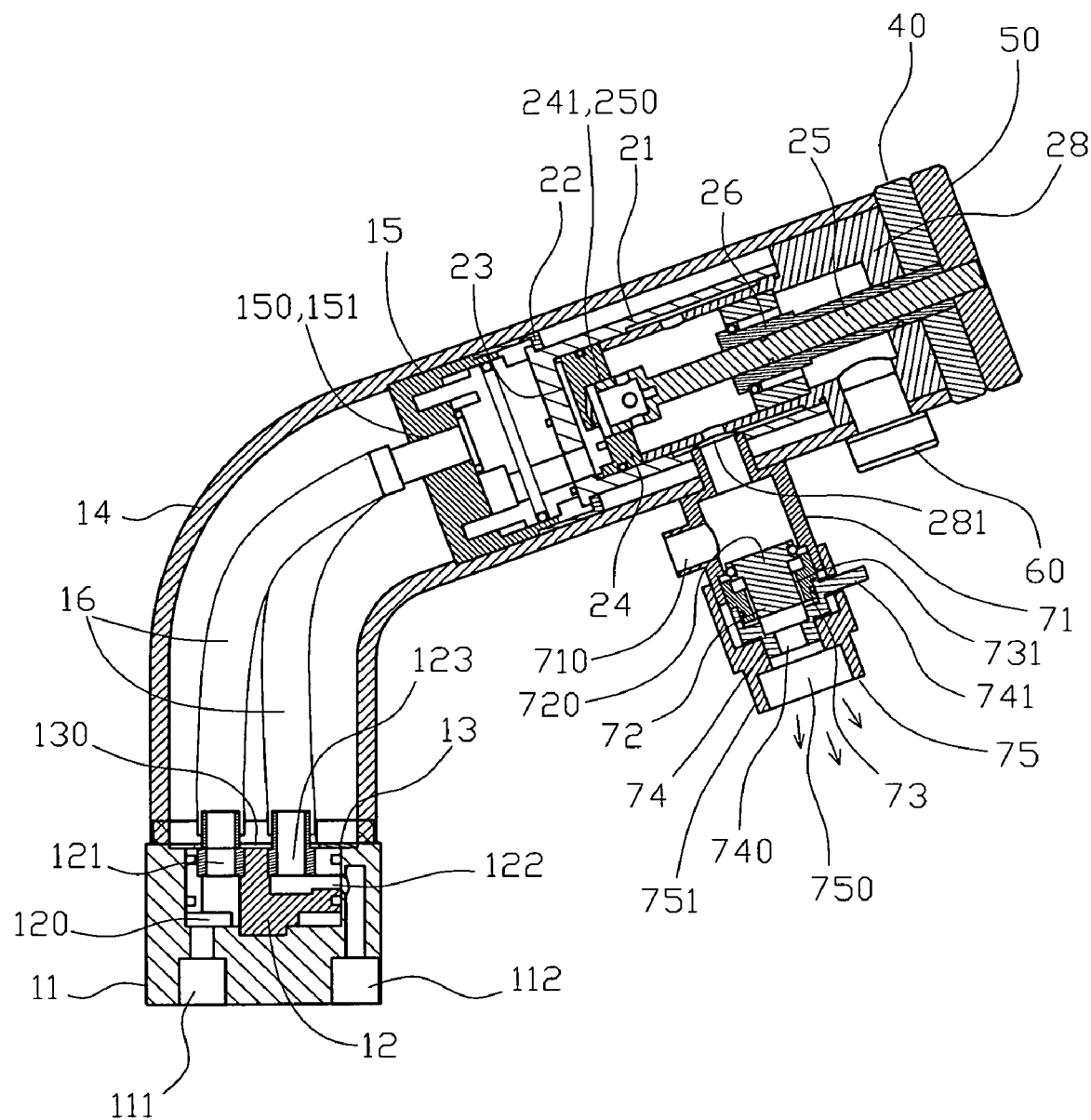
FIG. 10 is a plan cross-sectional view of the faucet as shown in FIG. 1.
Figure 11:
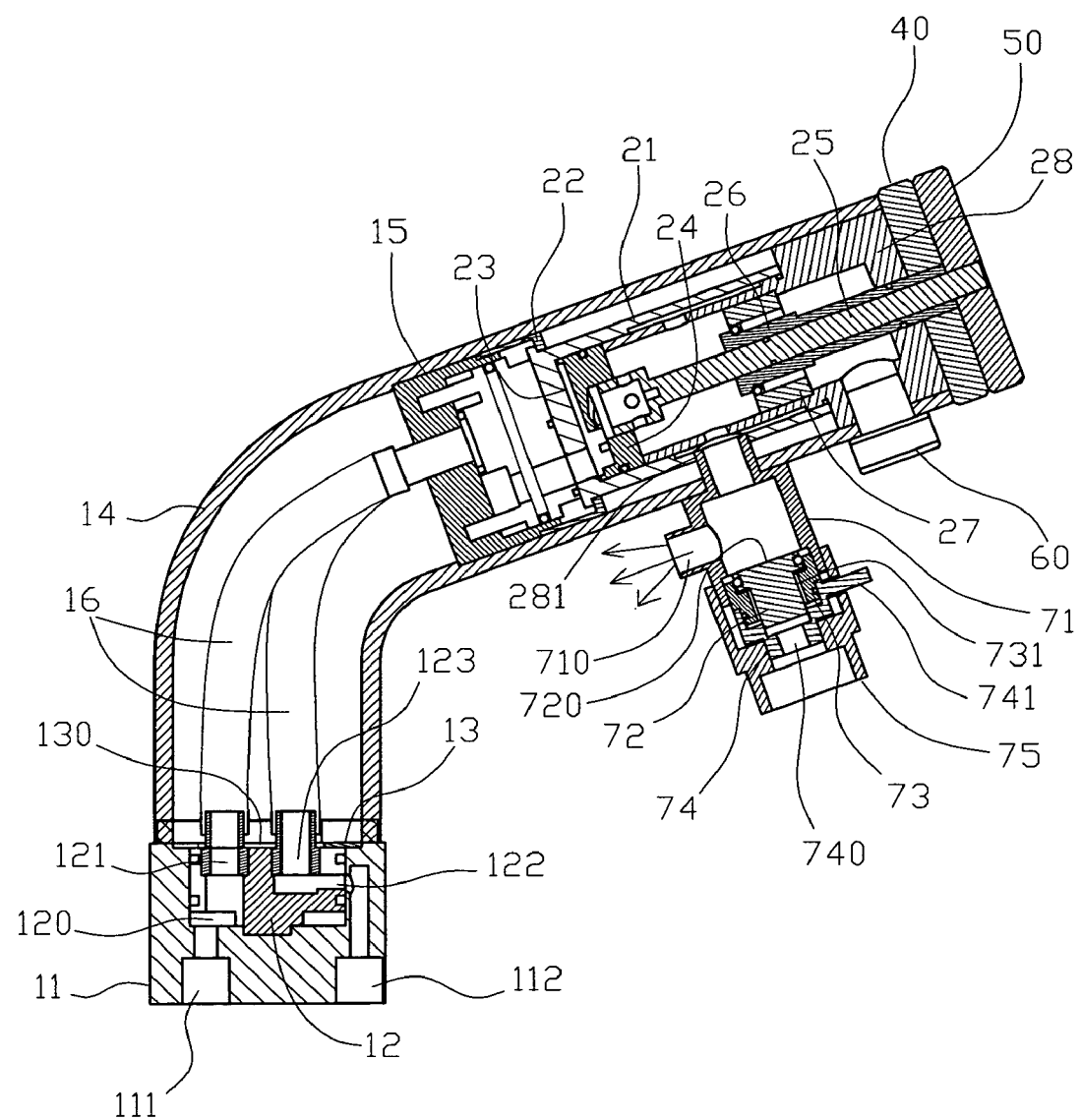
FIG. 11 is a schematic operational view of the faucet as shown in FIG. 10.

Referring to FIGS. 9-11, the secondary water dividing unit 70 includes a front valve tube 71, a control valve seat 73, a water control seat 72, a rear valve tube 75, and a switching seat 74.

The front valve tube 71 is connected to the side water outlet holes 281 of the inner valve tube 28 and has a side formed with a water outlet connecting hole 710 and a lower end formed with an inner thread 711.

The control valve seat 73 has an outer wall formed with an outer thread 732 screwed into the inner thread 711 of the front valve tube 71 and an inner wall formed with a screw portion 730 and a plurality of flow channels 731.

The water control seat 72 has a first end formed with an enlarged water stop 720 that is movable relative to the control valve seat 73 to open or seal the flow channels 731 of the control valve seat 73 and a second end formed with a control lever 721. The water control seat 72 has a screw portion 722 screwed into the screw portion 730 of the control valve seat 73 so that the water control seat 72 is movable relative to the control valve seat 73 by rotation of the water control seat 72.

The rear valve tube 75 is secured on the front valve tube 71 and has an inside formed with a water passage 750 and a lower end formed with a connecting section 751.

The switching seat 74 is secured on the control lever 721 of the water control seat 72 to rotate the water control seat 72 and has an inside formed with a water passage 740 connected to the flow channels 731 of the control valve seat 73 and the water passage 750 of the rear valve tube 75. The switching seat 74 is rotatably mounted in the rear valve tube 75 and has a periphery formed with a water control shaft 741 protruding from the rear valve tube 75 to rotate the switching seat 74.

When in use, the water outlet connecting hole 710 of the front valve tube 71 and the connecting section 751 of the rear valve tube 75 are connected to two water outlet equipments, such as a shower head and a water outlet pipe. Thus, the water control seat 72 is rotated by the switching seat 74 so that the water stop 720 of the water control seat 72 is movable relative to the control valve seat 73 to open or seal the flow channels 731 of the control valve seat 73.

As shown in FIG. 10, when the water stop 720 of the water control seat 72 is movable relative to the control valve seat 73 to open the flow channels 731 of the control valve seat 73, the water from the front valve tube 71 flows through the flow channels 731 of the control valve seat 73, the water passage 740 of the switching seat 74 and the water passage 750 of the rear valve tube 75.

As shown in FIG. 11, when the water stop 720 of the water control seat 72 is movable relative to the control valve seat 73 to seal the flow channels 731 of the control valve seat 73, the water from the front valve tube 71 directly flow outward from the water outlet connecting hole 710.

Accordingly, the primary water dividing unit 20 has two different water outlet manners, and the secondary water dividing unit 70 also has two different water outlet manners, so that the faucet has multiple different water outlet manners by the primary water dividing unit 20 and the secondary water dividing unit 70, thereby enhancing the versatility of the faucet. In addition, the rotation unit 10 is rotatable so that the faucet is rotatable so as to adjust the angle of the faucet.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A faucet, comprising:
   a rotation unit;
   a primary water dividing unit mounted on the rotation unit;
   a water outlet member mounted on the rotation unit;
   a secondary water dividing unit mounted on the rotation unit;
   a first control switch mounted on the primary water dividing unit to open/close a water flow and to control a mixture proportion of cold and hot water;
   a second control switch mounted on the primary water dividing unit to control water to flow into either one of the water outlet member and the secondary water dividing unit;
   wherein the rotation unit includes a fixing seat, a rotation seat, a limit plate, a connecting seat, a support seat, and two connecting pipes, wherein:
   the fixing seat has a first face formed with a receiving chamber and a second face formed with a first water inlet channel connected to a bottom of the receiving chamber and a second water inlet channel connected to a side of the receiving chamber;
   the rotation seat is rotatably mounted in the receiving chamber of the fixing seat and has a first face formed with a first water inlet slot that is constantly connected to the first water inlet channel of the fixing seat during rotation of the rotation seat, a side formed with a substantially arcuate shaped second water inlet slot that is constantly connected to the second water inlet channel of the fixing seat during rotation of the rotation seat, and a second face formed with a first water conducting hole connected to the first water inlet slot and a second water conducting hole connected to the second water inlet slot;

the limit plate is secured in the receiving chamber of the fixing seat without rotation and rested on the rotation seat;

the connecting seat has a first portion mounted on the fixing seat and a second portion formed with a first through hole and a second through hole;

the support seat is mounted in the connecting seat and has an inside formed with two water inlet holes;

the two connecting pipes are mounted in the connecting seat to connect the first water conducting hole and the second water conducting hole of the rotation seat to the two water inlet holes of the support seat.

2. The faucet in accordance with claim 1, wherein the connecting seat is rotatably mounted on the fixing seat and connected to the rotation seat so that the rotation seat is rotated with the connecting seat.

3. The faucet in accordance with claim 1, wherein the connecting seat is substantially V-shaped.

4. The faucet in accordance with claim 1, wherein the connecting seat has an inside formed with a mounting section for mounting the support seat.

5. The faucet in accordance with claim 1, wherein the limit plate is substantially U-shaped.

6. The faucet in accordance with claim 1, wherein the limit plate has an inside formed with a limit hole, and the two connecting pipes are limited by the limit hole of the limit plate.

7. The faucet in accordance with claim 1, wherein the primary water dividing unit is mounted in the connecting seat of the rotation unit.

8. The faucet in accordance with claim 1, wherein the primary water dividing unit includes an outer valve tube, a mounting ring, a water control plate, a water control seat, an inner valve tube, a control valve seat, a first control shaft, and a second control shaft, wherein:

the outer valve tube has a closed bottom wall formed with two water control holes connected to the two water inlet holes of the support seat, the outer valve tube has a periphery formed with a side water outlet hole connected to the first through hole of the connecting seat;

the water control plate is rotatably mounted in the outer valve tube and has an inside formed with two water control holes connected to the two water control holes of the outer valve tube;

the water control seat has a first side formed with a regulating slot connected to the two water control holes of the water control plate;

the inner valve tube has a first end extended into the outer valve tube and having a periphery formed with a plurality of side water outlet holes each connected to the side water outlet hole of the outer valve tube, and a second end protruding from the outer valve tube and having a periphery formed with a side water outlet bore connected to the second through hole of the connecting seat, the inner valve tube has an inside formed with a receiving space connected to the side water outlet holes and the side water outlet bore;

the control valve seat is secured in the receiving space of the inner valve tube and has an inside formed with a plurality of flow channels each connected to the side water outlet bore of the inner valve tube;

the first control shaft has a first end secured to the water control seat to rotate the water control seat and a second end protruding from the connecting seat of the rotation unit, the first end of the first control shaft has an inside formed with a water inlet recess connected to the regulating slot of the water control seat and a periphery formed with a plurality of water outlet holes each connected to the water inlet recess and each connected to the side water outlet holes of the inner valve tube through the receiving space of the inner valve tube;

the second control shaft has a first end movably mounted in the control valve seat and a second end protruding from the connecting seat of the rotation unit, the first end of the second control shaft has an end portion formed with an enlarged water stop that is movable relative to the control valve seat to open or seal the flow channels of the control valve seat.

9. The faucet in accordance with claim 8, wherein the mounting ring is mounted on the outer valve tube and secured to the support seat of the rotation unit to attach the primary water dividing unit to the rotation unit.

10. The faucet in accordance with claim 8, wherein the support seat has an outer wall formed with an outer thread, the outer valve tube has an outer wall formed with an outwardly extended flange and an inner wall formed with a locking portion, and the mounting ring has an inner wall having a first end formed with an inwardly extended flange rested on the flange of the outer valve tube and a second end formed with an inner thread screwed onto the outer thread of the support seat.

11. The faucet in accordance with claim 8, wherein the two water control holes of the outer valve tube are arranged in a circular rotation path and located at a first interval, and the two water control holes of the water control plate are arranged in a circular rotation path and located at a second interval different from the first interval of the two water control holes of the outer valve tube.

12. The faucet in accordance with claim 8, wherein the water control seat is rotatably mounted in the outer valve tube and secured on the water control plate to rotate the water control plate.

13. The faucet in accordance with claim 8, wherein the water control seat has a second side formed with an insertion hole connected to the regulating slot, and the first end of the first control shaft is provided with an insertion portion inserted into the insertion hole of the water control seat.

14. The faucet in accordance with claim 8, wherein the inside of the control valve seat is formed with an inner thread, and the first end of the second control shaft has an outer thread screwed into the inner thread of the control valve seat so that the second control shaft is movable relative to the control valve seat by rotation of the second control shaft.

15. The faucet in accordance with claim 8, wherein the second control shaft has an inside formed with a mounting hole mounted on the first control shaft.

16. The faucet in accordance with claim 8, wherein:
the first control switch is secured on the second end of the first control shaft to rotate the first control shaft;
the second control switch is secured on the second end of the second control shaft to rotate the second control shaft;

the water outlet member is extended through the second through hole of the connecting seat into the side water outlet bore of the inner valve tube;

the secondary water dividing unit is extended through the first through hole of the connecting seat and the side water outlet hole of the outer valve tube and connected to the side water outlet holes of the inner valve tube.

17. The faucet in accordance with claim 8, wherein the secondary water dividing unit includes a front valve tube, a control valve seat, a water control seat, a rear valve tube, and a switching seat, wherein:

the front valve tube is connected to the side water outlet holes of the inner valve tube and has a side formed with a water outlet connecting hole and a lower end formed with an inner thread;

the control valve seat has an outer wall formed with an outer thread screwed into the inner thread of the front valve tube and an inner wall formed with a screw portion and a plurality of flow channels;

the water control seat has a first end formed with an enlarged water stop that is movable relative to the control valve seat to open or seal the flow channels of the control valve seat and a second end formed with a control lever, the water control seat has a screw portion screwed into the screw portion of the control valve seat so that the water control seat is movable relative to the control valve seat by rotation of the water control seat;

the rear valve tube is secured on the front valve tube and has an inside formed with a water passage and a lower end formed with a connecting section;

the switching seat is secured on the control lever of the water control seat to rotate the water control seat and has an inside formed with a water passage connected to the flow channels of the control valve seat and the water passage of the rear valve tube, the switching seat is rotatably mounted in the rear valve tube and has a periphery formed with a water control shaft protruding from the rear valve tube to rotate the switching seat.

18. The faucet in accordance with claim 8, wherein the second end of the inner valve tube has an inside formed with a passage to allow passage of the second control shaft.

19. The faucet in accordance with claim 1, further comprising a balance valve mounted between the primary water dividing unit and the rotation unit.

* * * * *